(12) United States Patent
Kim et al.

(10) Patent No.: US 12,302,008 B2
(45) Date of Patent: May 13, 2025

(54) IMAGE SENSOR MODULE AND METHOD OF OPERATING THE SAME

(71) Applicant: Samsung Electronics Co., Ltd., Suwon-si (KR)

(72) Inventors: Kyoungyoung Kim, Suwon-si (KR); Sangsoo Ko, Yongin-si (KR); Byeoungsu Kim, Hwaseong-si (KR); Sanghyuck Ha, Yongin-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 294 days.

(21) Appl. No.: 17/727,055

(22) Filed: Apr. 22, 2022

(65) Prior Publication Data
US 2022/0345624 A1 Oct. 27, 2022

(30) Foreign Application Priority Data
Apr. 23, 2021 (KR) .................. 10-2021-0053166

(51) Int. Cl.
H04N 23/80 (2023.01)
G06T 1/20 (2006.01)
(Continued)

(52) U.S. Cl.
CPC ............ *H04N 23/80* (2023.01); *G06T 1/20* (2013.01); *G06T 1/60* (2013.01); *G06T 7/11* (2017.01);
(Continued)

(58) Field of Classification Search
CPC .... H04N 23/80; H04N 23/665; H04N 1/2129; G06T 7/12; G06T 7/11; G06T 1/20;
(Continued)

(56) References Cited

U.S. PATENT DOCUMENTS 10,003,759 B2   6/2018  Fan
10,379,772 B2 * 8/2019  Willcock .............. G06F 3/0638
(Continued)

FOREIGN PATENT DOCUMENTS

KR    10-2154834 B1    10/2019
KR    10-2020-0097841 A  8/2020

OTHER PUBLICATIONS

Sony Develops the Industry's First*1 3-Layer Stacked CMOS Image Sensor with DRAM for Smartphones; Dated Feb. 7, 2017.
(Continued)

*Primary Examiner* — Lin Ye
*Assistant Examiner* — Fayez A Bhuiyan
(74) *Attorney, Agent, or Firm* — Harness, Dickey & Pierce, P.L.C.

(57) ABSTRACT

An image sensor module includes an image sensor configured to generate image data; a memory including a processor in memory (PIM) circuit, of the PIM circuit including banks configured to store the image data and a plurality of processing elements; and a signal processor, wherein the memory is configured to read the image data from the banks, perform a first image processing operation on the image data by using the processing elements corresponding to the banks, and store image-processed image data on which the first image processing operation is performed in the banks or output the image-processed image data.

19 Claims, 15 Drawing Sheets

(51) Int. Cl.
    *G06T 1/60*           (2006.01)
    *G06T 7/11*           (2017.01)
    *G06T 7/12*           (2017.01)
    *H04N 1/21*          (2006.01)
    *H04N 23/60*        (2023.01)

(52) U.S. Cl.
    CPC ............ *G06T 7/12* (2017.01); *H04N 1/2129* (2013.01); *H04N 23/665* (2023.01); *G06T 2207/20021* (2013.01); *G06T 2207/20084* (2013.01)

(58) Field of Classification Search
    CPC ............ G06T 1/60; G06T 2207/20021; G06T 2207/20084
    See application file for complete search history.

(56) References Cited

U.S. PATENT DOCUMENTS

| | | | |
|---|---|---|---|
| 10,528,613 | B2 | 1/2020 | Zhang |
| 10,573,679 | B2 | 2/2020 | Kwon |
| 10,834,347 | B2 | 11/2020 | Jung et al. |
| 10,834,352 | B2 | 11/2020 | Qin et al. |
| 11,983,619 | B2 * | 5/2024 | Gong ................. G11C 13/0069 |
| 2011/0149116 | A1 | 6/2011 | Kim |
| 2019/0244087 | A1 | 8/2019 | Park et al. |
| 2019/0324646 | A1 * | 10/2019 | Homma ................. H04N 23/80 |
| 2020/0258926 | A1 | 8/2020 | Seo et al. |
| 2021/0216243 | A1 * | 7/2021 | Shin ...................... G06F 3/0659 |

OTHER PUBLICATIONS

Sony to Release World's First Intelligent Vision Sensors with AI Processing Functionality; dated May 14, 2020.
Sony Launches First Three-Layer, 960 fps Camera with Sandwich-Stacked DRAM; dated May 2, 2017.
Triple Stacked CMOS Image Sensor Including DRAM [PAMTEK] dated Jun. 16, 2017.

\* cited by examiner

IMAGE SENSOR MODULE AND METHOD OF OPERATING THE SAME

CROSS-REFERENCE TO RELATED APPLICATION

This application is based on and claims priority under 35 U.S.C. § 119 to Korean Patent Application No. 10-2021-0053166, filed on Apr. 23, 2021, in the Korean Intellectual Property Office, the disclosure of which is incorporated by reference herein in its entirety.

BACKGROUND

The inventive concepts provide image sensor modules and methods of operating the same, and more particularly, to an image sensor module including a memory for performing calculation processing and a method of operating the same.

An image sensor is a device for capturing a 2-dimensional image or a 3-dimensional image of a target object. An image sensor generates an image of a target object by using photoelectric conversion elements sensitive to the intensity of light reflected by a target object. Recently, as complementary metal-oxide semiconductor (CMOS) technologies are being developed, CMOS image sensors have been widely used.

Recently, as demands for high quality and high resolution photos and video increase, the size of image data generated by an image sensor has been increasing. Meanwhile, when the size of image data increases, a high bandwidth is beneficial for smooth calculation processing.

SUMMARY

The inventive concepts provide image sensor modules including a memory for performing calculation processing and methods of operating the same.

According to an aspect of the inventive concepts, there is provided an image sensor module including an image sensor configured to generate image data; a memory including a processor in memory (PIM) circuit, the PIM circuit including banks configured to store the image data and a plurality of processing elements; and a signal processor, wherein the memory is configured to read the image data from the banks, perform a first image processing operation on the image data by using the processing elements corresponding to the banks, and store image-processed image data on which the first image processing operation is performed in the banks or output the image-processed image data.

According to another aspect of the inventive concepts, there is provided a method of operating an image sensor module including an image sensor and a memory, the method including obtaining image data by using the image sensor; storing the image data in banks included in the memory; performing an image processing operation on the image data by using processing elements included in the memory and corresponding to the banks; and storing image-processed image data in the memory or outputting the image-processed image data from the memory.

According to another aspect of the inventive concepts, there is provided an image sensor module including an image sensor configured to generate image data; and a memory configured to store the image data, wherein the memory includes a memory bank including a first bank and a second bank adjacent to each other; a processor in memory (PIM) circuit including a first processing element connected to the first bank and a second processing element connected to the second bank; and a local bus for transmission and reception of data between the memory bank and the PIM circuit.

BRIEF DESCRIPTION OF THE DRAWINGS

Example embodiments of the inventive concepts will be more clearly understood from the following detailed description taken in conjunction with the accompanying drawings in which.

DETAILED DESCRIPTION OF THE EMBODIMENTS

Figure 1:
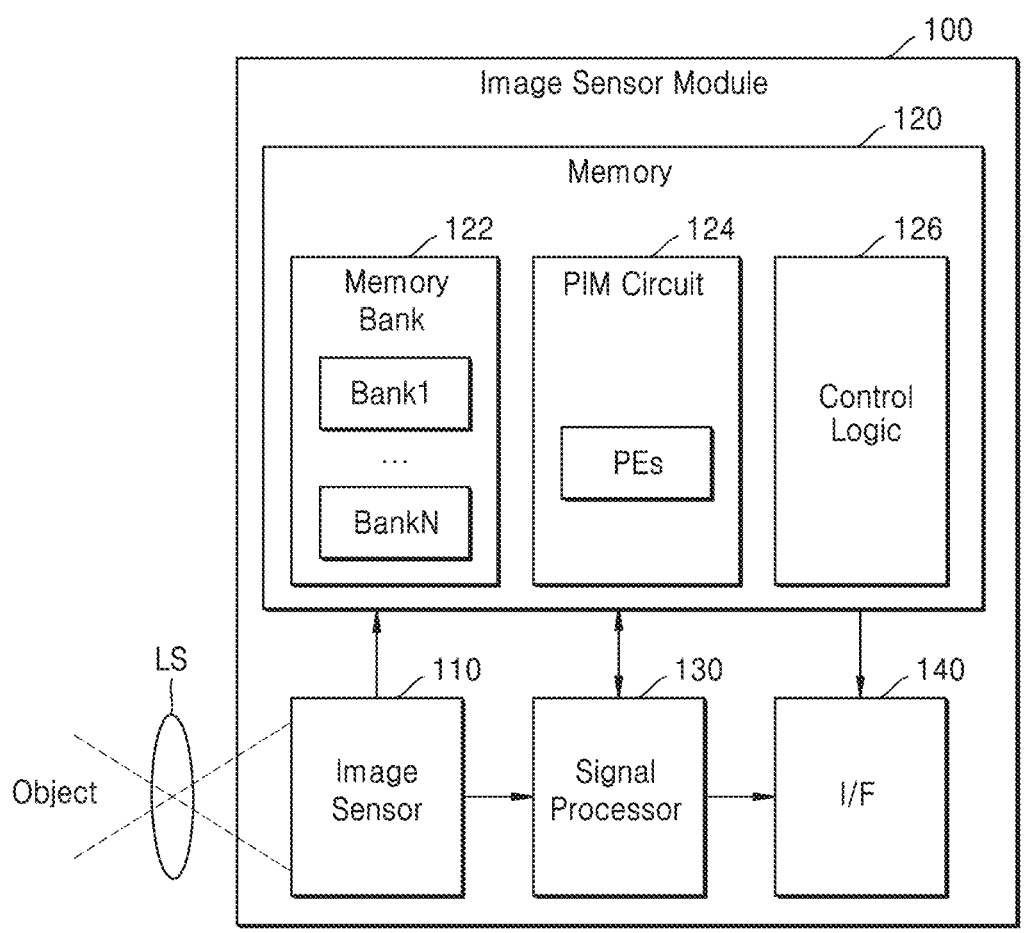
FIG. 1 is a block diagram showing an image sensor module according to some example embodiments of the inventive concepts.

FIG. 1 is a block diagram showing an image sensor module according to some example embodiments of the inventive concepts.

An image sensor module 100 may sense an image regarding a target object, process a sensed image, store a sensed image in a memory, or store a processed image in the memory. According to some example embodiments, the image sensor module 100 may be mounted on a digital camera, a digital camcorder, a mobile phone, a tablet PC, a portable electronic device, or the like. The portable electronic device may include a laptop computer, a mobile phone, a smartphone, a tablet PC, a personal digital assistant (PDA), an enterprise digital assistant (EDA), a digital still camera, a digital video camera, an audio device, a portable multimedia player (PMP), a personal navigation device (PND), an MP3 player, a handheld game console, an e-book device, a wearable device, etc. Also, the image sensor module 100 may be installed as a part on a drone, an advanced drivers assistance system (ADAS), or an electronic device provided as a component of a vehicle, furniture, a manufacturing facility, a door, and various measuring devices.

Referring to FIG. 1, the image sensor module 100 may include an image sensor 110, a memory 120, a signal processor 130, and an interface 140. According to some example embodiments, the image sensor module 100 may be implemented by a plurality of semiconductor chips. However, the inventive concepts are not limited thereto, and the image sensor module 100 may also be implemented by one semiconductor chip.

The image sensor module 100 may photograph an external target object (or object) and generate image data. The image sensor module 100 may include the image sensor 110 that may convert optical signals of a target object incident through a lens LS into electric signals. The image sensor 110 may include a pixel array in which a plurality of pixels are 2-dimensionally arranged and may output image data including a plurality of pixel values respectively corresponding to the pixels of the pixel array.

The pixel array may include a plurality of row lines, a plurality of column lines, and a plurality of pixels that are respectively connected to the row lines and the column lines and arranged in a matrix-like form. The pixels may each include at least one photoelectric conversion element (or light sensing element). The photoelectric conversion element may sense light and convert sensed light into photocharges. For example, the photoelectric conversion element may be a light sensing element including an organic material or an inorganic material, e.g., a photodiode, an organic photodiode, a perovskite photodiode, a phototransistor, a photo gate, a pinned photodiode, etc. According to some example embodiments, the pixels may each include a plurality of photoelectric conversion elements.

Pixels of the pixel array may each sense a light signal of at least one color from among a plurality of reference colors. For example, the reference colors may include red, green, and blue, may include red, green, blue, and white, or may include other colors. For example, the reference colors may include cyan, yellow, green, and magenta. The pixel array may generate pixel signals including information regarding reference colors of the respective pixels.

A color filter array for transmitting light of particular spectrum range may be provided over the pixels, and, according to color filters respectively arranged on the pixels, colors that may be sensed by corresponding pixels may be determined. However, the inventive concepts are not limited thereto. In some example embodiments, a particular photoelectric conversion element may convert light of a particular wavelength band into electric signals according to a level of an electric signal applied to the photoelectric conversion element.

In some example embodiments, image data generated by the image sensor 110 may include raw image data including a plurality of pixel values obtained through digital-to-analog conversion of a plurality of pixel signals output from the pixel array or may include image data obtained by performing pre-processing on raw image data. In some example embodiments, the image sensor 110 may include a driving and reading circuit for controlling the pixel array and converting pixel signals received from the pixel array into pixel values. For example, the driving and reading circuit may include a row driver, a read-out circuit, a ramp signal generator, a timing controller, etc. The driving and reading circuit may generate raw image data including pixel values respectively corresponding to received pixel signals. In some example embodiments, the image sensor 110 may further include a processing logic for performing pre-processing on raw image data. The image sensor 110 may transmit raw image data or pre-processed image data to the memory 120 and/or the signal processor 130.

The memory 120 may include a memory bank 122, a processor in memory (PIM) circuit 124, and control logic 126. The memory bank 122 may include a plurality of banks Bank1 to BankN (N being a positive integer), and the banks Bank1 to BankN may each include a memory cell array including a plurality of memory cells. A bank may be defined in various ways. For example, a bank may be defined as a configuration including memory cells or may be defined as a configuration including one or more peripheral circuits together with memory cells.

The memory 120 may store image data generated by the image sensor 110 or image data processed by the signal processor 130. In some example embodiments, the memory bank 122 may store image data received from the image sensor 110 or the signal processor 130 in at least one of the banks Bank1 to BankN. For example, the memory bank 122 may divide image data received from the image sensor 110 or the signal processor 130 into a predetermined (or, alternatively, desired) size and store divided image data in at least one of the banks Bank1 to BankN. Also, the memory bank 122 may read out image data stored in advance under the control of the image sensor module 100 and transmit read out image data to the signal processor 130 or the memory interface 140.

The memory 120 may perform calculation processing on image data received from the image sensor 110 or image data stored in the memory 120 by using the PIM circuit 124. In some example embodiments, the PIM circuit 124 may perform calculation processing related to various types of image processing operations by using processing elements (PEs).

In some example embodiments, the PIM circuit 124 may perform various image processing operations like an operation to which an image enhancement algorithm is applied, a classification operation, and/or a segmentation operation on image artifacts included in image data. The operation to which an image enhancement algorithm is applied may include white balancing, denoising, demosaicing, remosaicing, lens shading, and/or gamma correction. However, the inventive concepts are not limited thereto, and the operation to which an image enhancement algorithm is applied may include various other image processing operations.

In some example embodiments, the image processing operations may be implemented as neural network-based tasks, and the PIM circuit 124 may perform at least some of neural network-based calculation processings. The neural network may be a neural network model based on at least one of an Artificial Neural Network (ANN), a Convolution Neural Network (CNN), a Region with Convolution Neural Network (R-CNN), a Region Proposal Network (RPN), a Recurrent Neural Network (RNN), a Stacking-based Deep Neural Network (S-DNN), a State-Space Dynamic Neural Network (S-SDNN), a Deconvolution Network, a Deep Belief Network (DBN), a Restricted Boltzmann Machine (RBM), a Fully Convolutional Network, a Long Short-Term Memory (LSTM) Network, a Classification Network, a Plain Residual Network, a Dense Network, a Hierarchical Pyramid Network, a Fully Convolutional Network or the like. However, the types of neural network models are not limited to the above-stated examples. A method by which the PIM circuit 124 performs neural network-based calculation processing will be described below in detail with reference to FIG. 2.

In some example embodiments, the PEs of the PIM circuit 124 may read out image data from the banks Bank1 to BankN of the memory bank 122 and perform the above-stated image processing operations on the read out image data. The memory 120 may store image data on which a calculation processing is performed by using the PIM circuit 124 back in the memory bank 122. Also, the memory 120 may provide, to the signal processor 130, image data on which a calculation processing is performed by using the PIM circuit 124. Also, the memory 120 may output image data, on which a calculation processing is performed, to a device outside the image sensor module 100 through the interface 140.

The control logic 126 may perform a control operation regarding the memory bank 122 and the PIM circuit 124. In some example embodiments, the control logic 126 may perform a decoding operation for a command and an address provided to the memory 120 and control the memory bank 122 and the PIM circuit 124, such that a memory operation is performed according to a result of the decoding operation. For example, a command provided to the memory 120 may include a command related to a memory operation like write/read of data and a command related to a calculation operation. According to a result of the decoding operation, the control logic 126 may control the memory bank 122 to perform a memory operation for writing/reading data to/from a storage region corresponding to an address or control the PIM circuit 124 to perform a calculation operation based on data written in the storage region corresponding to the address.

The memory 120 may include dynamic random access memory (DRAM) like a double data rate synchronous dynamic random access memory (DDR SDRAM), low power double data rate LPDD (LPDDR) SDRAM, graphics double data rate (GDDR) SDRAM, and Rambus dynamic random access memory (RDRAM). However, example embodiments of the inventive concepts are not necessarily limited thereto. For example, the memory 120 may also include a non-volatile memory like flash memory, magnetic RAM (MRAM), ferroelectric RAM (FeRAM), phase change RAM (PRAM), resistive RAM (ReRAM) or the like.

Also, the memory 120 may be a configuration corresponding to one semiconductor chip or one channel in a memory device including a plurality of channels each having an independent interface. In some example embodiments, the memory 120 may be a configuration corresponding to a memory module. In some example embodiments, a memory module may include a plurality of memory chips, and the memory 120 of FIG. 1 may correspond to one memory chip mounted on a module board.

The signal processor 130 may perform calculation processing on image data received from the image sensor 110 or the memory 120. For example, the signal processor 130 may include a central processing unit (CPU), a microprocessor, or a microcontroller unit (MCU). In some example embodiments, the signal processor 130 may perform calculation processing related to various image processing operations. For example, the signal processor 130 may perform various image processing operations like white balancing, denoising, demosaicing, remosaicing, lens shading, gamma correction, classification operation, and segmentation operation.

In some example embodiments, the signal processor 130 may receive image data on which a particular image processing operation is performed by the memory 120 and perform remaining image processing operations on received image data. For example, the signal processor 130 may receive image data on which denoising is performed by the memory 120 and perform at least one of white balancing, demosaicing, remosaicing, lens shading, gamma correction, classification operation, and segmentation operation on received image data.

In some example embodiments, the signal processor 130 may receive image data from the image sensor 110 and perform various image processing operations on received image data. Next, the signal processor 130 may transmit processed image data to the memory 120. The memory 120 may store image data received from the signal processor 130.

The image sensor module 100 may output image data through the interface 140. In some example embodiments, the interface 140 may output image data stored in the memory 120 or image data processed by the signal processor 130. For example, the interface 140 may be implemented as a camera serial interface (CSI) based on the mobile industry processor interface (MIPI). However, the type of the interface 140 is not limited thereto, and the interface 140 may be implemented according to various protocol standards.

The image sensor module 100 according to some example embodiments of the inventive concepts performs calculation processing by using the memory 120 capable of performing calculation processing, and thus, a calculation speed of an image processing operation may be increased. In detail, because a bandwidth between the memory bank 122 and the PIM circuit 124 in the memory 120 is generally higher than the bandwidth between the memory 120 and the signal processor 130, a calculation speed may be increased when calculation processing is performed by using the memory 120. Also, when a calculation speed increases, a neural network operation to which more layers are applied may be performed within the same time period, and thus, the accuracy of a calculation operation of the image sensor module 100 may be improved.

In addition, in some example embodiments shown in FIG. 1, the PEs may include various numbers of PEs. For example, each PE may be provided in correspondence to one bank, or each PE may be provided in correspondence to two or more banks.

Also, although FIG. 1 shows that the memory bank 122 and the PIM circuit 124 are separated from each other for convenience of understanding, the inventive concepts are not limited thereto, and the memory bank 122 and the PIM circuit 124 may be at least partially integrated with each other. Detailed descriptions thereof will be given below with reference to FIGS. 3A to 3C.

Figure 2:
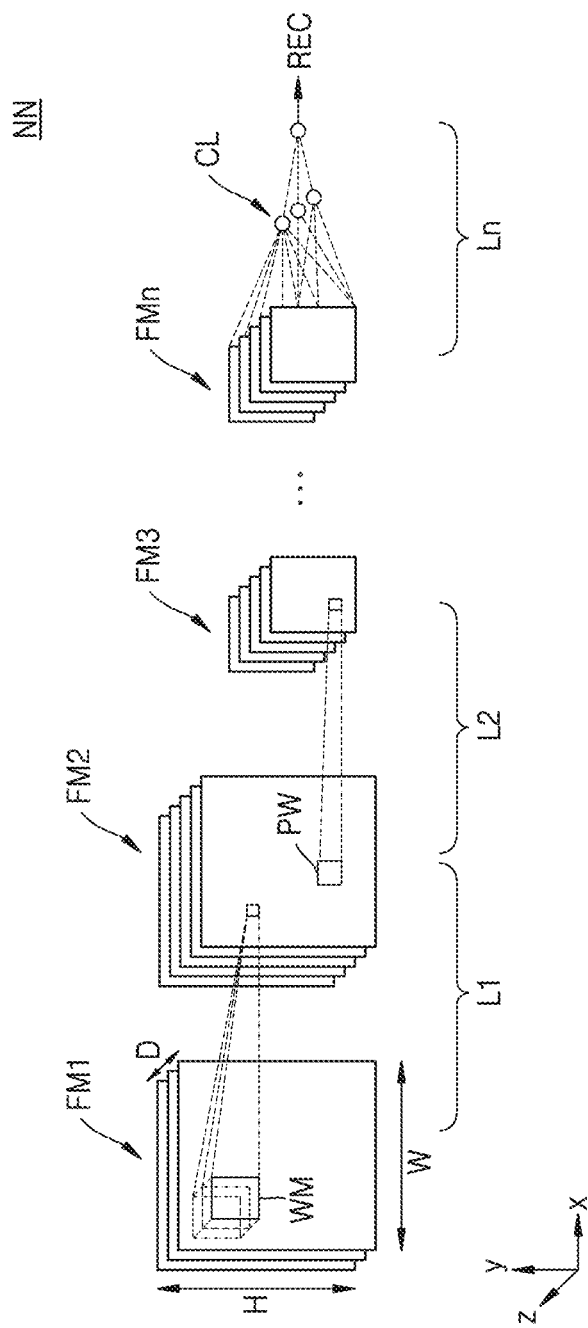
FIG. 2 is a diagram showing an example of a neural network structure.

FIG. 2 is a diagram showing an example of a neural network structure. The PIM circuit 124 of FIG. 1 may be applied for implementation of at least a portion of the structure of a neural network NN of FIG. 2.

Referring to FIG. 2, the neural network NN may include a plurality of layers L1 to Ln. The neural network having such a multi-layered structure may be referred to as a deep neural network (DNN) or a deep learning architecture. Each of the layers L1 to Ln may be a linear layer or a non-linear layer, and, in some example embodiments, at least one linear layer and at least one non-linear layer may be combined with each other to be referred to as one layer. For example, a linear layer may include a convolution layer and a fully connected layer, and a non-linear layer may include a pooling layer and an activation layer.

For example, a first layer L1 may be a convolution layer, a second layer L2 may be a pooling layer, and an n-th layer Ln may be, as an output layer, a fully connected layer. The neural network NN may further include an activation layer and may further include layers for performing other types of operations.

The layers L1 to Ln may each receive an input image frame or a feature map generated in a previous layer as an input feature map and generate an output feature map or a recognition signal REC by processing the input feature map. Here, the feature map refers to data in which various characteristics of input data are expressed. Feature maps FM1, FM2, FM3, and FMn may each have, for example, a 2-dimensional matrix shape or a 3-dimensional matrix shape including a plurality of feature values (or referred to as a tensor). The feature maps FM1, FM2, FM3, and FMn have a width W (or a column), a height H (or a row), and a depth D, which may respectively correspond to the x-axis, the y-axis, and the z-axis in a coordinate system. Here, the depth D may be referred to as the number of channels.

The first layer L1 may generate a second feature map FM2 by convoluting a first feature map FM1 with a weight map WM. The weight map WM may have a form of a 2-dimensional matrix or a 3-dimensional matrix including a plurality of weight values. The weight map WM may also be referred to as a kernel. The weight map WM may filter the first feature map FM1 and may be referred to as a filter or a kernel. A depth (e.g., the number of channels) of the weight map WM is the same as a depth (e.g., the number of channels) of the first feature map FM1, and the same channels of the weight map WM and the first feature map FM1 may be convoluted with each other. The weight map WM is shifted in a manner of traversing the first input feature map FM1 as a sliding window. During each shift, each of weights included in the weight map WM may be multiplied by all feature values in a region overlapping the first feature map FM1 and summed. As the first feature map FM1 and the weight map WM are convoluted with each other, one channel of a second feature map FM2 may be generated. Although one weight map WM is shown in FIG. 2, as a plurality of weight maps are actually convoluted with the first feature map FM1, a plurality of channels of the second feature map FM2 may be generated. In other words, the number of channels of the second feature map FM2 may correspond to the number of weight maps.

The second layer L2 may generate a third feature map FM3 by changing a spatial size of the second feature map FM2 through pooling. Pooling may be referred to as sampling or down-sampling. A 2-dimensional pooling window PW may be shifted on the second feature map FM2 by the size of the pooling window PW as a unit, and the maximum value (or an average value) of feature values in a region overlapping the pooling window PM may be selected. Therefore, the third feature map FM3 having a changed spatial size may be generated from the second feature map FM2. The number of channels of the third feature map FM3 is identical to the number of channels of the second feature map FM2.

An n-th layer Ln may classify classes CL of input data by combining features of an n-th feature map FMn. Also, recognition signals REC corresponding to respective classes may be generated. However, the structure of the neural network NN is not limited to the above-stated example, and some of the layers L1 to Ln may be omitted or other layers may be additionally provided.

According to some example embodiments of the inventive concepts, the PEs of the PIM circuit 124 of FIG. 1 may implement at least one of a convolution layer, a fully connected layer, a poolinglayer, and an activation layer of the neural network NN. For example, some PEs of the PIM circuit 124 may be configured to perform a convolution operation for image data read out from the banks Bank1 to BankN, and some other PEs of the PIM circuit 124 may be configured to perform a pooling operation for a result of the convolution operation.

Figure 3A:
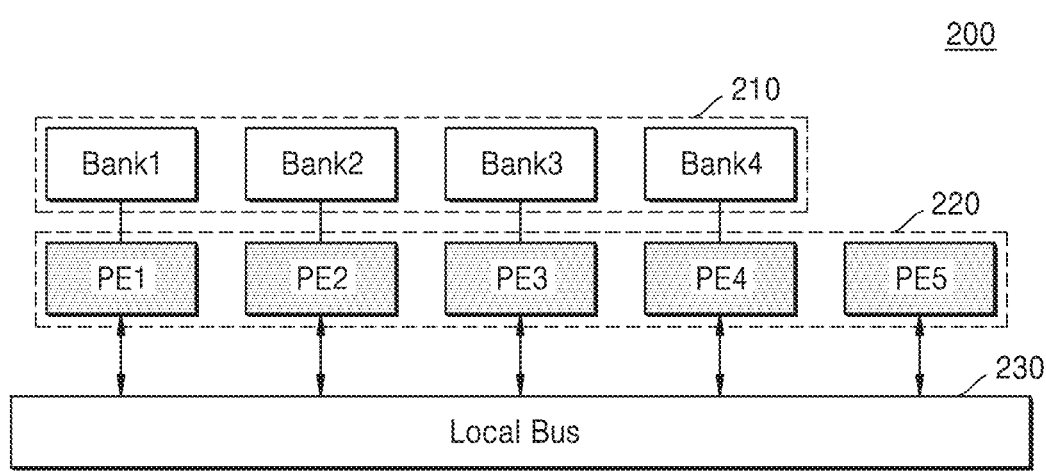
FIGS. 3A to 3C are block diagrams showing portions of a memory according to some example embodiments of the inventive concepts.
Figure 3B:
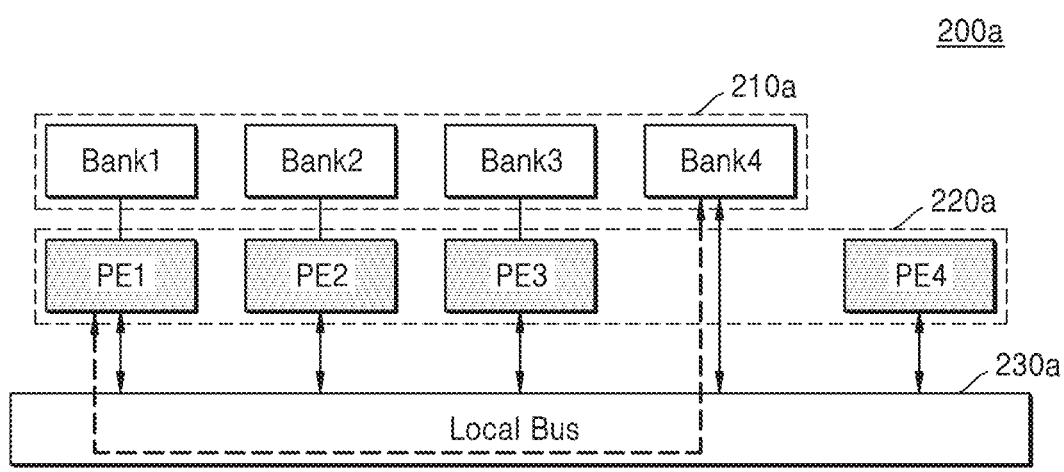
Figure 3C:
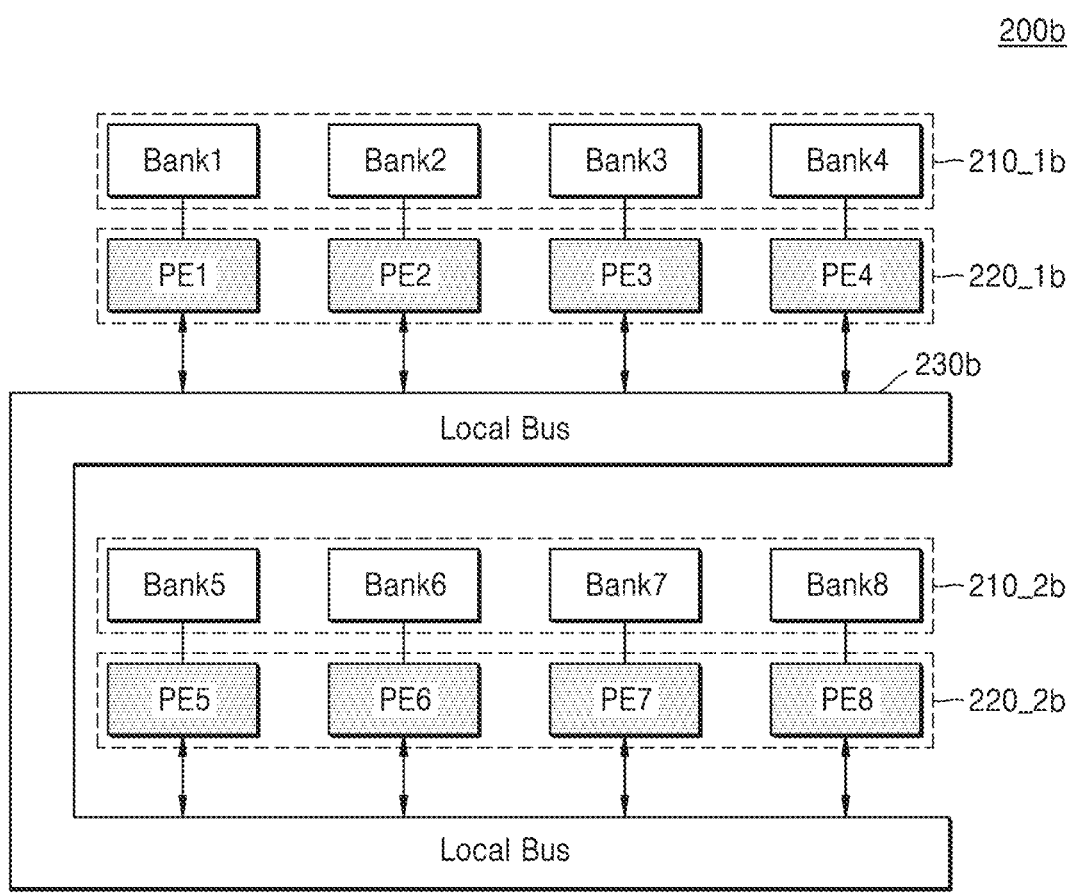

FIGS. 3A to 3C are block diagrams showing portions of a memory according to some example embodiments of the inventive concepts. Memories 200, 200a, and 200b of FIGS. 3A to 3C may each correspond to the memory 120 of FIG. 1.

First, referring to FIG. 3A, the memory 200 includes a bank group 210, a PE group 220, and a local bus 230. In some example embodiments, the bank group 210 includes first to fourth banks Bank1 to Bank4, and the PE group 220 includes first to fourth PEs PE1 to PE4 respectively corresponding to the first to fourth banks Bank1 to Bank4. Also, the PE group 220 may further include a fifth PE PE5 independent to the bank group 210.

In some example embodiments, the first to fourth banks Bank1 to Bank4 may be respectively connected to the first to fourth PEs PE1 to PE4 according to a corresponding relationship. For example, referring to FIG. 3A, the first bank Bank1 may be connected to the first PE PE1, the second bank Bank2 may be connected to the second PE PE2, the third bank Bank3 may be connected to the third PE PE3, and the fourth bank Bank4 may be connected to the fourth PE PE4.

During a storage operation of the memory 200, the bank group 210 may store data transmitted through the local bus 230. In some example embodiments, the memory 200 may receive image data from the image sensor 110 of FIG. 1, and at least one of the first to fourth banks Bank1 to Bank4 may store at least a portion of the image data. For example, the image data may be divided into portions of a pre-set (or, alternatively, desired) size and stored in at least one of the first to fourth banks Bank1 to Bank4.

During a calculation operation of the memory 200, some of the PEs of the PE group 220 (e.g., the first to fourth PEs PE1 to PE4) may each perform a calculation operation based on data stored in a corresponding bank of the bank group 210. At this time, the first to fourth PEs PE1 to PE4 may perform calculation operations in parallel. As a non-limiting example, the first to fourth PEs PE1 to PE4 may perform a convolution operation from among neural network operations based on image data stored in corresponding banks. In other words, the first to fourth PEs PE1 to PE4 may perform neural network operations in parallel.

For example, referring to FIG. 3A, the first PE PE1 may perform a calculation operation based on data stored in the first bank Bank1, the second PE PE2 may perform a calculation operation based on data stored in the second bank Bank2, the third PE PE3 may perform a calculation operation based on data stored in the third bank Bank3, and the fourth PE PE4 may perform a calculation operation based on data stored in the fourth bank Bank4.

In some example embodiments, a PE independent to the bank group 210 in the PE group 220 (e.g., the fifth PE PE5) may perform a calculation operation based on results of calculation operations of the first to fourth PEs PE1 to PE4. As a non-limiting example, the fifth PE PE5 may perform a pooling operation from among neural network operations based on the results of the calculation operations of the first to fourth PEs PE1 to PE4. The fifth PE PE5 may receive the results of the calculation operations of the first to fourth PEs PE1 to PE4 through the local bus 230 and perform a pooling operation based on the results of the calculation operations.

In other words, the fifth PE PE5 may perform neural network operations based on the results of the calculation operations.

In some example embodiments, results of calculation operations of the PE group 220 may be stored in the bank group 210. For example, the results of the calculation operations of the first to fourth PEs PE1 to PE4 may be stored in corresponding banks, respectively. Also, a result of a calculation operation of the fifth PE PE5 may be stored in at least one of the first to fourth banks Bank1 to Bank4.

However, locations for storing results of calculation operations of the PE group 220 are not limited thereto and may be independent to a corresponding relationship between PEs and banks. For example, a result of a calculation operation of the first PE PE1 may be transmitted to the second bank Bank2 through the local bus 230 and stored therein.

Referring to FIG. 3B, a memory 200a includes a bank group 210a, a PE group 220a, and a local bus 230a. In some example embodiments, the bank group 210a includes first to third banks Bank1 to Bank3, and the PE group 220a includes first to third PEs PE1 to PE3 respectively corresponding to the first to third banks Bank1 to Bank3. Also, the PE group 220a may further include a fourth PE PE4 independent to the bank group 210a. Hereinafter, descriptions identical to those given above with reference to FIG. 3A will be omitted.

During a storage operation of the memory 200a, the bank group 210a may store data transmitted through the local bus 230a. In some example embodiments, the memory 200a may receive image data from the image sensor 110 of FIG. 1, and at least one of the first to fourth banks Bank1 to Bank4 may store at least a portion of the image data. For example, the image data may be divided into portions of a pre-set (or, alternatively, desired) size and stored in at least one of the first to fourth banks Bank1 to Bank4.

During a calculation operation of the memory 200a, some of the PEs of the PE group 220a (e.g., the first to third PEs PE1 to PE3) may each perform a calculation operation based on data stored in a corresponding bank of the bank group 210a. At this time, the first to third PEs PE1 to PE3 may perform calculation operations in parallel. As a non-limiting example, the first to third PEs PE1 to PE3 may perform a convolution operation from among neural network operations based on image data stored in corresponding banks.

In some example embodiments, although the PE group 220a of FIG. 3B does not include a PE corresponding to the fourth bank Bank4, data stored in the fourth bank Bank4 may be transmitted to the PE group 220a through the local bus 230a. Then, the PE group 220a may perform a calculation operation based on the data of the fourth bank Bank4 received through the local bus 230a.

For example, referring to FIG. 3B, the first PE PE1 from among the first to third PEs PE1 to PE3 may perform a convolution operation from among neural network operations based on image data stored in the fourth bank Bank4. In detail, target image data stored in the fourth bank Bank4 may be transmitted to the first bank Bank1 connected to the first PE PE1 through the local bus 230a and stored therein. Then, the first PE PE1 may perform a calculation operation for the target image data read out from the first bank Bank1. Also, according to some example embodiments, the target image data stored in the fourth bank Bank4 may be transmitted to the first PE PE1 through the local bus 230a without being transmitted to, stored in, and read out from the first bank Bank1. Then, the first PE PE1 may perform a calculation operation for the target image data received through the local bus 230a. In some example embodiments, the target image data stored in the fourth bank Bank4 may be transmitted to one or more of first to third banks Bank1 to Bank3, and/or first to third PEs PE1 to PE3 through the local bus 230a as described above. In other words, the target image data stored in the fourth bank Bank4 may be transferred to one or more locations such that a processing element PE (e.g., one or more of first to third Pes PE1 to PE3) may perform a calculation operation for the target image data received through the local bus 230a.

In other words, PEs according to some example embodiments of FIG. 3B may not only perform calculation operations based on data stored in corresponding banks, but also receive data stored in a non-corresponding bank and perform a calculation operation based on received data. Therefore, even when the PE group 220a includes a relatively small number of PEs, a convolution operation may be performed for data stored in the bank group 210a.

To perform a convolution operation as described above, the control logic 126 of FIG. 1 may control the memory bank 122 of FIG. 1 and the PIM circuit 124 of FIG. 1 based on address information and operation sequence information. For example, the control logic 126 may read out fourth image data from the fourth bank Bank4 based on address information regarding the fourth bank Bank4 and transmit the fourth image data to the first PE PE1. At this time, the first PE PE1 may be set to perform calculation processing for first image data read out from the first bank Bank1 as well. Therefore, according to operation sequence information, the control logic 126 may transmit the fourth image data to the first bank Bank1 before or after calculation processing for the first image data read out from the first bank Bank1 is performed and control the first PE PE1 to perform calculation processing for the fourth image data.

In some example embodiments, a PE independent to the bank group 210a in the PE group 220a (e.g., the fourth PE PE4) may perform a calculation operation based on results of calculation operations of the first to third PEs PE1 to PE3. As a non-limiting example, the fourth PE PE4 may perform a pooling operation from among neural network operations based on the results of the calculation operations of the first to third PEs PE1 to PE3. The fourth PE PE4 may receive the results of the calculation operations of the first to third PEs PE1 to PE3 through the local bus 230a and perform a pooling operation based on the results of the calculation operations.

In some example embodiments, results of calculation operations of the PE group 220a may be stored in the bank group 210a. For example, the results of the calculation operations of the first to third PEs PE1 to PE3 may be stored in corresponding banks, respectively. In some example embodiments, the results of the calculation operations of the first to third PEs PE1 to PE3 may be transmitted to the fourth bank Bank4 through the local bus 230a and stored therein. Also, a result of a calculation operation of the fourth PE PE4 may be stored in at least one of the first to fourth banks Bank1 to Bank4.

However, locations for storing results of calculation operations of the PE group 220a are not limited thereto and may be independent to a corresponding relationship between PEs and banks. For example, a result of a calculation operation of the first PE PE1 may be transmitted to the second bank Bank2 through the local bus 230a and stored therein.

In some example embodiments shown in FIGS. 3A and 3B, the numbers of banks included in the bank group 210 (bank groups 210 and 210a) and the numbers of PEs included in the PE group 220 (PE groups 220 and 220a) are merely examples, and the inventive concepts are not limited thereto. The bank groups 210 and 210a may include more or fewer banks, and the PE groups 220 and 220a may include more or fewer PEs.

Also, in some example embodiments shown in FIGS. 3A and 3B, it has been illustrated and described that the memory 200 or 200a includes a PE that performs a pooling operation (e.g., the fifth PE PE5 of FIG. 3A or the fourth PE PE4 of FIG. 3B), but the inventive concepts are not limited thereto. For example, the memory 200 or 200a may not include a PE that performs a pooling operation.

Referring to FIG. 3C, a memory 200b may include a first bank group 210_1b, a second bank group 210_2b, a first PE group 220_1b, and a second PE group 220_2b. In some example embodiments, the first bank group 210_1b includes first to fourth banks Bank1 to Bank4, and the first PE group 220_1b includes first to fourth PEs PE1 to PE4 respectively corresponding to the first to fourth banks Bank1 to Bank4. Also, the second bank group 210_2b includes fifth to eighth banks Bank5 to Bank8, and the second PE group 220_2b includes fifth to eighth PEs PE5 to PE8 respectively corresponding to the fifth to eighth banks Bank5 to Bank8. Hereinafter, descriptions identical to those given above with reference to FIGS. 3A and 3B will be omitted.

In some example embodiments, the memory 200b may have a structure in which the first bank group 210_1b and the first PE group 220_1b are stacked on the second bank group 210_2b and the second PE group 220_2b. Also, various data of the memory 200b may be transmitted to the first bank group 210_1b, the second bank group 210_2b, the first PE group 220_1b, and the second PE group 220_2b through a local bus 230b.

During a storage operation of the memory 200b, the first bank group 210_1b and the second bank group 210_2b may store data transmitted through the local bus 230b. In some example embodiments, the memory 200b may receive image data from the image sensor 110 of FIG. 1, and at least one of first to eighth banks Bank1 to Bank8 may store at least a portion of the image data. For example, the image data may be divided into portions of a pre-set (or, alternatively, desired) size and stored in at least one of the first to eighth banks Bank1 to Bank8.

During a calculation operation of the memory 200b, the first PE group 220_1b may perform a first calculation operation based on data stored in the first bank group 210_1b, and the second PE group 220_2b may perform a second calculation operation based on data stored in the second bank group 210_2b. The first calculation operation and the second calculation operation may be identical to or different from each other, and may be performed at the same time, or different times.

However, the inventive concepts are not limited thereto, and the first PE group 220_1b may receive data stored in the second bank group 210_2b through the local bus 230b and perform a first calculation operation based on received data. Also, the second PE group 220_2b may receive data stored in the first bank group 210_1b through the local bus 230b and perform a second calculation operation based on received data.

Also, according to some example embodiments, the first PE group 220_1b may receive a second calculation result of a second calculation operation performed by the second PE group 220_2b through the local bus 230b and perform a first calculation operation based on the second calculation result. Also, the second PE group 220_2b may receive a first calculation result of a first calculation operation performed by the first PE group 220_1b through the local bus 230b and perform a second calculation operation based on the first calculation result.

Meanwhile, in some example embodiments shown in FIG. 3C, it has been illustrated and described that the memory 200b does not include a PE that performs a pooling operation (e.g., the fifth PE PE5 of FIG. 3A or the fourth PE PE4 of FIG. 3B), but the inventive concepts are not limited thereto. For example, the memory 200b may further include a PE that performs a pooling operation, for example, the first PE group 220_1b and the second PE group 220_2b may share a PE that performs a pooling operation, or may each have a PE that performs a pooling operation.

Figure 4:
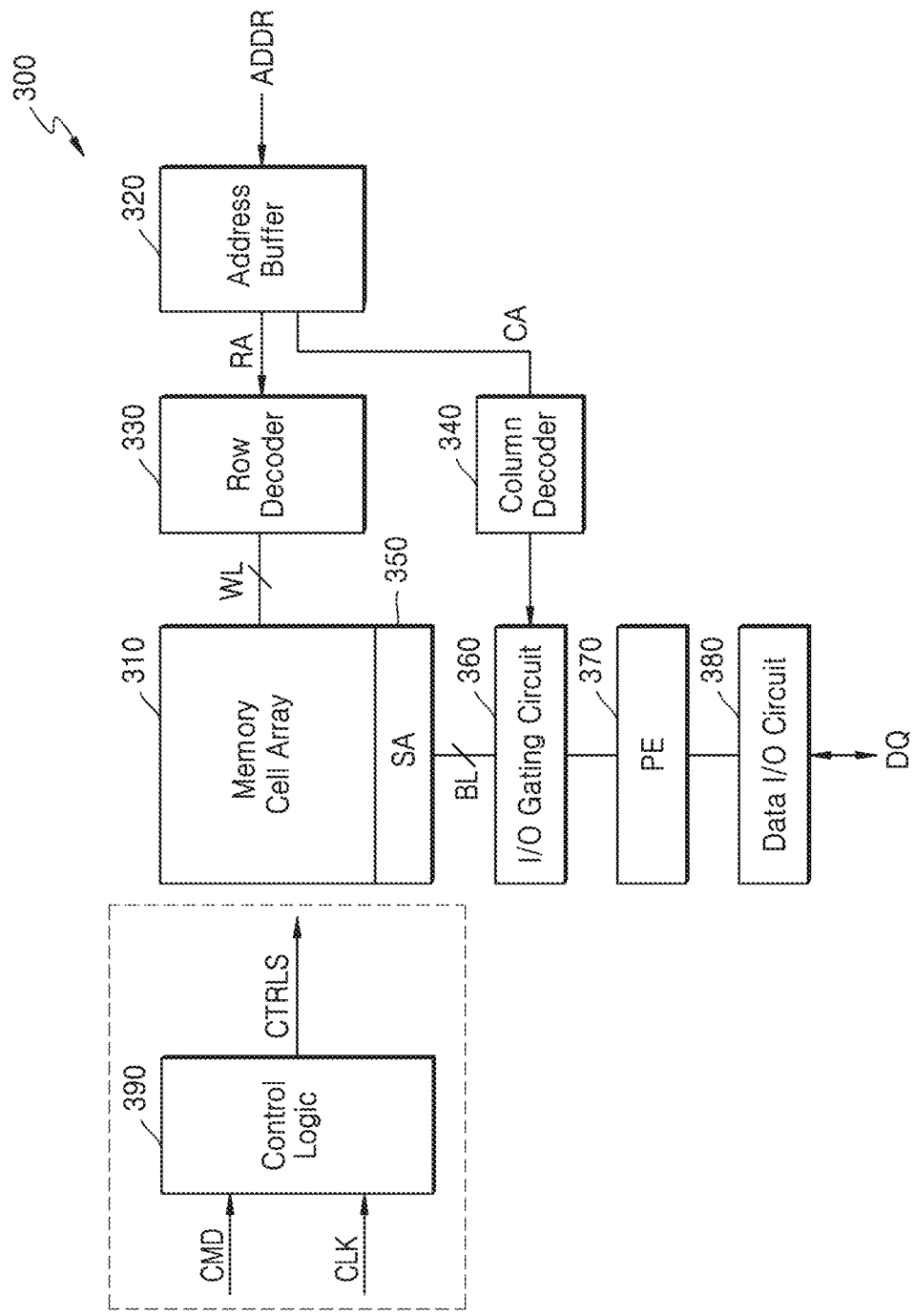
FIG. 4 is a block diagram showing the structure of a memory according to some example embodiments of the inventive concepts.

FIG. 4 is a block diagram showing the structure of a memory according to some example embodiments of the inventive concepts. A memory 300 of FIG. 4 may correspond to the memory 120 of FIG. 1 and the memories 200, 200a, and 200b of FIGS. 3A to 3C. Also, FIG. 4 is a block diagram showing structures of a bank and a PE connected to each other in the memory 300, wherein the structures may be applied to the first bank Bank1 and the first PE PE1 of FIG. 3A, for example.

Referring to FIG. 4, the memory 300 may include a memory cell array 310, an address buffer 320, a row decoder 330, a column decoder 340, a sense amplifier 350, an input/output (I/O) gating circuit 360, a PE 370, a data I/O circuit 380, and a control logic 390.

The memory cell array 310 includes a plurality of memory cells provided in the form of a matrix including rows and columns. The memory cell array 310 includes a plurality of word lines WL and a plurality of bit lines BL connected to memory cells. The word lines WL may be connected to rows of memory cells, and a plurality of bit lines BL may be connected to columns of memory cells.

The address buffer 320 receives an address ADDR. The address ADDR includes a row address RA addressing a row of the memory cell array 310 and a column address CA addressing a column of the memory cell array 310. The address buffer 320 may transmit the row address RA to the row decoder 330 and transmit the column address CA to the column decoder 340.

The row decoder 330 may select any one of the word lines WL connected to the memory cell array 310. The row decoder 330 may decode the row address RA received from the address buffer 320, select any one word line WL corresponding to the row address RA, and activate the selected word line WL.

The column decoder 340 may select predetermined (or, alternatively, desired) bit lines BL from among the bit lines BL of the memory cell array 310. The column decoder 340 may generate a column select signal by decoding the column address CA received from the address buffer 320 and select the bit lines BL connected to the column select signal through the I/O gating circuit 360.

The sense amplifier 350 is connected to the bit lines BL of the memory cell array 310. The sense amplifier 350 senses a change in voltages of the bit lines BL, amplifies the change, and outputs an amplified change. The bit lines BL sensed and amplified by the sense amplifier 350 may be selected by the I/O gating circuit 360.

The I/O gating circuit 360 may include read data latches for storing read data of the bit lines BL selected by a column select signal and a write driver for writing write data to the memory cell array 310. Data stored in the read data latches may be provided to a data pad DQ through the data I/O circuit 380. Write data provided to the data I/O circuit 380 through the data pad DQ may be written to the memory cell array 310 through the write driver. The data pad DQ may be connected to a local bus inside the memory 300 (e.g., the local bus 230 of FIG. 3A).

The PE 370 may be disposed between the I/O gating circuit 360 and the data I/O circuit 380. The PE 370 may perform a calculation operation based on data read out from the memory cell array 310 or data received from the data I/O circuit 380. The PE 370 may be an arithmetic logic unit (ALU). The PE 370 may write a calculation result to the memory cell array 310 or provide a calculation result to the data pad DQ through the data I/O circuit 380.

The control logic 390 may receive a clock signal CLK and a command CMD and generate control signals CTRLS for controlling an operation timing, a memory operation, and/or a calculation operation of the memory 300. The control logic 390 may use the control signals CTRLS to read data from the memory cell array 310 and to write data to the memory cell array 310. Also, the control logic 390 may use the control signals CTRLS to control the PE 370 to perform calculation processing.

Although it has been illustrated and described with reference to FIG. 4 that the control logic 390 controls a memory operation and a calculation operation of the memory 300, the inventive concepts are not limited thereto. For example, the memory 300 may include a separate component (e.g., a processing controller) that generates control signals for controlling a calculation operation of the memory 300. In some example embodiments, the processing controller may generate control signals for controlling the PE 370.

Also, it has been illustrated and described with reference to FIG. 4 that the memory 300 includes the PE 370, but the inventive concepts are not limited thereto. For example, when there is no PE connected to a bank like the case of the fourth bank Bank4 of FIG. 3B, the PE 370 may be omitted in the example embodiments of FIG. 4.

Figure 5:
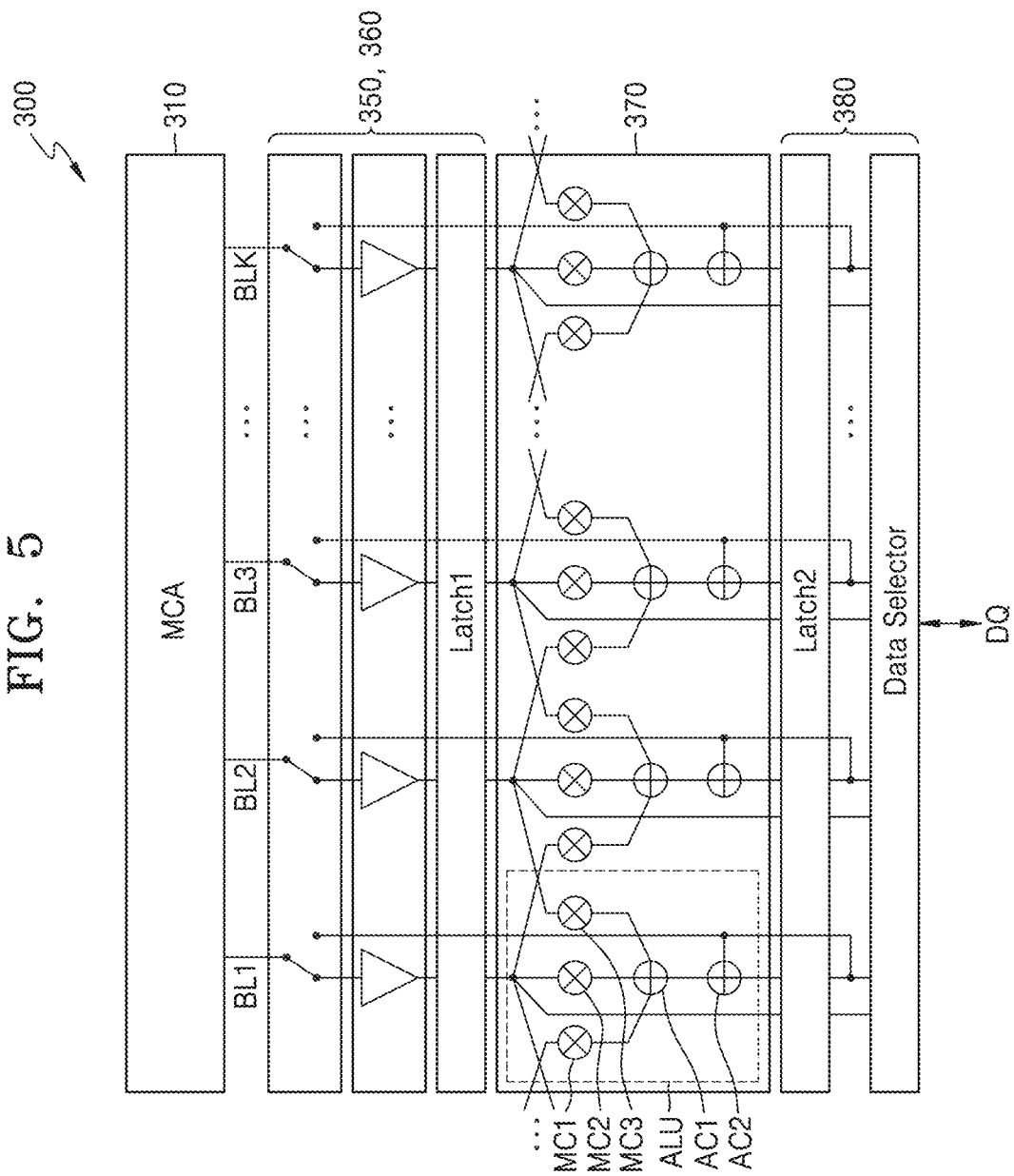
FIG. 5 is a diagram showing the structure of a memory according to some example embodiments of the inventive concepts in detail.

FIG. 5 is a diagram showing the structure of a memory according to some example embodiments of the inventive concepts in detail. In detail, FIG. 5 is a diagram showing the structure of the memory 300 of FIG. 4 in detail. Hereinafter, descriptions identical to those given above with reference to FIG. 4 will be omitted.

Referring to FIGS. 4 and 5, the memory 300 may further include various components related to calculation operations. For example, the PE 370 may include ALUs respectively corresponding to a plurality of bit lines BL1 to BLK (K being a positive integer) of the memory cell array 310.

An ALU may include first to third multiplying circuits MC1, MC2, and MC3 and first and second adding circuits AC1 and AC2. The first to third multiplying circuits MC1, MC2, and MC3 may output a plurality of multiplying operation results by performing multiplying operations between data respectively read out from a corresponding bit line and bit lines adjacent thereto and weights.

For example, referring to FIG. 5, a second multiplying circuit MC2 may output a second multiplying operation result by performing a multiplying operation between data read out from a corresponding bit line and a second weight. A first multiplying circuit MC1 may output a first multiplying operation result by performing a multiplying operation between data read out from a bit line disposed on the left of a corresponding bit line and a first weight. Also, a third multiplying circuit MC3 may output a third multiplying operation result by performing a multiplying operation between data read out from a bit line disposed on the right of a corresponding bit line and a third weight. Here, first to third weights may be identical to or different from one another. Also, the data respectively read out from the corresponding bit line and the bit lines adjacent thereto may correspond to data stored in a read data latch Latch1 through the sense amplifier 350.

A first adding circuit AC1 may output a first adding operation result by performing an adding operation between first to third multiplying operation results of the first to third multiplying circuits MC1, MC2, and MC3. Also, a second adding circuit AC2 may output a second adding operation result by performing an adding operation between the first adding operation result and the data read out from the corresponding bit line. Here, the data read out from the corresponding bit line may correspond to data directly transmitted from the memory cell array 310 without the intervention of the sense amplifier 350 and the read data latch Latch1.

As described above, calculation operations using the first to third multiplying circuits MC1, MC2, and MC3 and the first and second adding circuits AC1 and AC2 of the ALU are performed not only based on data of the corresponding bit line, but also data of the bit lines adjacent thereto. Therefore, the technical configuration may be applied to a convolution operation.

The data I/O circuit 380 may include a calculation data latch Latch2 for storing a second adding operation result output by the second adding circuit AC2 and a data selector for selecting data to be provided to the data pad DQ. The calculation data latch Latch2 may store a second multiplying operation result output by the second adding circuit AC2. In some example embodiments, the data selector may include at least one multiplexer (not shown).

Although FIGS. 4 and 5 are diagrams showing structures of a bank and a PE connected to each other, the inventive concepts are not limited thereto. For example, in case of a bank to which no PE is connected (e.g., the fourth bank Bank4 of FIG. 3B), the PE 370 of FIGS. 4 and 5 and the calculation data latch Latch2 included in the data I/O circuit 380 of FIG. 5 may be omitted.

Figure 6:
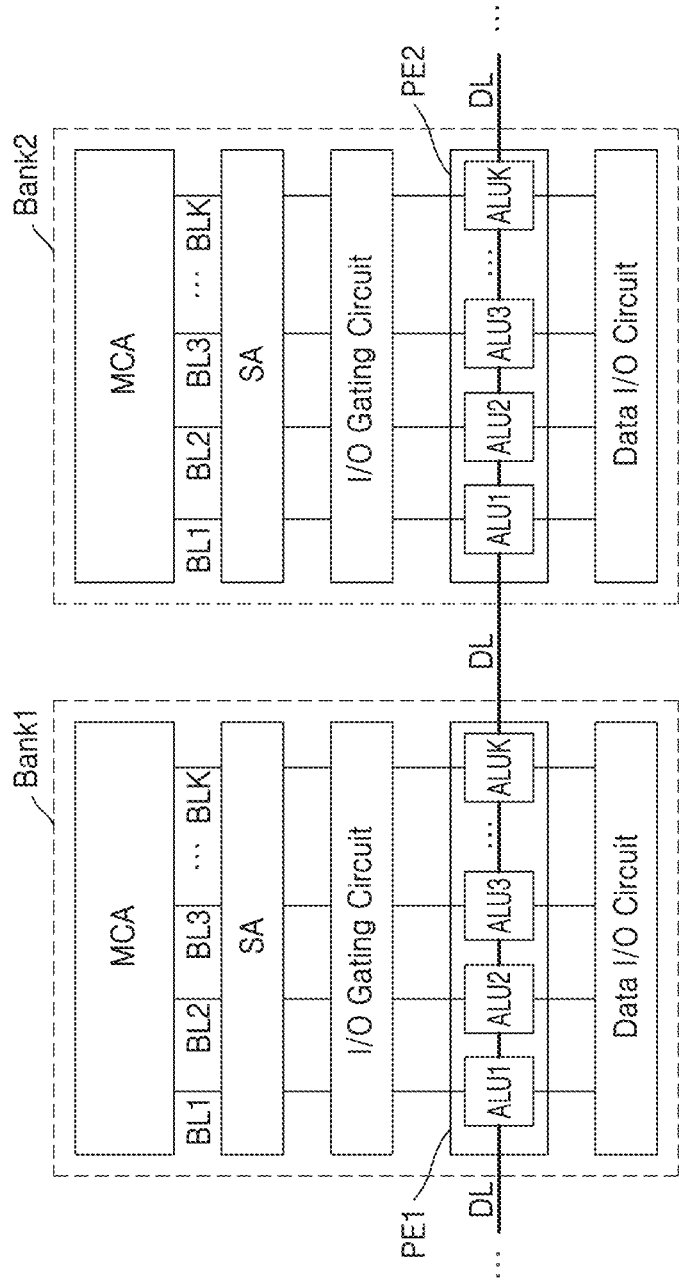
FIG. 6 is a diagram showing the structure of banks adjacent to each other, according to some example embodiments of the inventive concepts.
Figure 7:
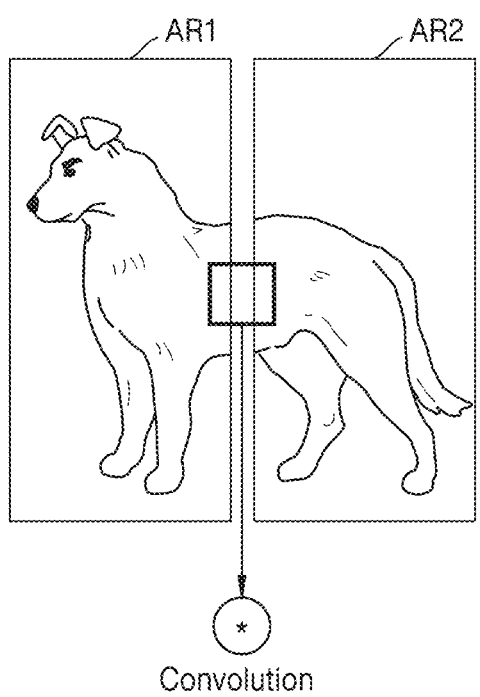
FIG. 7 is a diagram showing image regions adjacent to each other.

FIG. 6 is a diagram showing the structure of banks adjacent to each other, according to some example embodiments of the inventive concepts. FIG. 7 is a diagram showing image regions adjacent to each other. The structures of the banks adjacent to each other of FIG. 6 will be described based on the first bank Bank1 and the second bank Bank2 as an example. The first PE PE1 and the second PE PE2 may be arranged at the first bank Bank1 and the second bank Bank2 of FIG. 6, respectively. Also, because the structure of a memory described above with reference to FIGS. 4 and 5 may be applied to the first bank Bank1 and the second bank Bank2 of FIG. 6, descriptions identical to those already given above with reference to FIGS. 4 and 5 will be omitted.

In some example embodiments, the first bank Bank1 and the second bank Bank2 may store image regions adjacent to each other in one image (e.g., adjacent regions of image data). For example, referring to FIG. 7, for a first image region AR1 and a second image region AR2 adjacent to each other, the first bank Bank1 may store the first image region AR1 and the second bank Bank2 may store the second image region AR2.

Also, the first PE PE1 of the first bank Bank1 and the second PE PE2 of the second bank Bank2 may be connected to each other through a data line DL. In detail, the first bank Bank1 and the second bank Bank2 may each include a plurality of ALUs ALU1 to ALUK, and ALUs adjacent to each other may be connected to each other through the data line DL.

Also, according to some example embodiments of the inventive concepts, the outermost ALUs from among the ALUs ALU1 to ALUK of each of the first bank Bank1 and the second bank Bank2 may be connected to the outermost ALUs of an adjacent bank through the data line DL.

Referring to FIG. 6, an ALU ALUK of the first bank Bank1 and an ALU ALU1 of the second bank Bank2 may be connected to each other through the data line DL. In some example embodiments, the ALU ALUK of the first bank Bank1 may receive data of a bit line BL1 corresponding to the ALU ALU1 of the second bank Bank2 through the data line DL. Received data may be input to the third multiplying circuit MC3 included in the ALU ALUK of the first bank Bank1. Also, the ALU ALU1 of the second bank Bank2 may receive data of a bit line BLK corresponding to the ALU ALUK of the first bank Bank1 through the data line DL. Received data may be input to the first multiplying circuit MC1 included in the ALU ALU1 of the second bank Bank2.

To summarize, the outermost ALUs from among a plurality of ALUs included in a particular bank may be connected to the outermost ALUs from among a plurality of ALUs included in banks adjacent thereto through the data line DL. In detail, a leftmost (or rightmost) ALU may be connected to a rightmost (or leftmost) ALU included in an adjacent bank on the left (or right) through the data line DL. However, the inventive concepts are not limited thereto, and the adjacent banks may be oriented on different planes, above/below one another, and other configurations.

Therefore, the first PE PE1 and the second PE PE2 of FIG. 6 may perform a calculation operation for edges of image regions (e.g., a convolution operation). For example, referring to FIG. 7, because data corresponding to edges of the first image region AR1 and the second image region AR2 adjacent to each other may be input to the first PE PE1 and the second PE PE2 through the data line DL, the first PE PE1 and the second PE PE2 may perform a calculation operation for the edges of the first image region AR1 and the second image region AR2.

Although it has been illustrated and described with reference to FIG. 6 that the data line DL is formed between the ALUs ALU1 to ALUK of the first PE PE1 and the second PE PE2, the inventive concepts are not limited thereto. For example, the data line DL may also be implemented to be connected to the ALUs ALU1 to ALUK and output lines of an I/O gating circuit. For example, the ALU ALUK of the first bank Bank1 may receive data through the data line DL connected to an output line corresponding to a first bit line BL1 from among output lines of the I/O gating circuit of the second bank Bank2.

Figure 8:
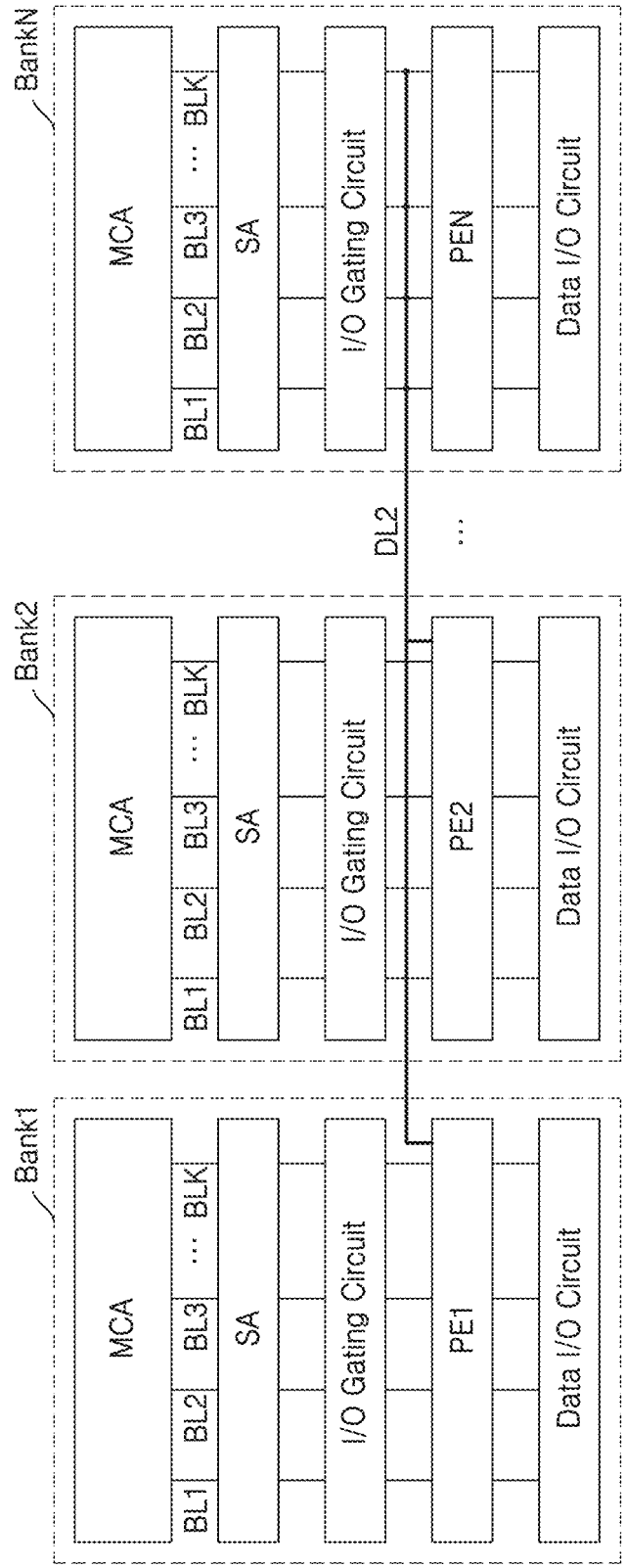
FIG. 8 is a diagram showing the structure of memory banks adjacent to each other, according to some example embodiments of the inventive concepts.

FIG. 8 is a diagram showing the structure of memory banks adjacent to each other, according to some example embodiments of the inventive concepts. FIG. 8 is a diagram showing a possible modification of some example embodiments of FIG. 6. The structures of banks adjacent to each other of FIG. 8 will be described based on the first bank Bank1, the second bank Bank2, and an N-th bank BankN as an example. The first bank Bank1 and the second bank Bank2 of FIG. 8 may correspond to the first bank Bank1 and the second bank Bank2 of FIG. 6, respectively, and an N-th PE PEN may be disposed at the N-th bank BankN of FIG. 8. Also, because the structure of a memory described above with reference to FIGS. 4 and 5 may be applied to the first bank Bank1, the second bank Bank2, and the N-th bank BankN of FIG. 8, descriptions identical to those already given above with reference to FIGS. 4 and 5 will be omitted.

In some example embodiments, the first bank Bank1 and the second bank Bank2 may store image regions adjacent to each other in one image, and the first PE PE1 and the second PE PE2 may perform calculation processings for the image regions stored in the first bank Bank1 and the second bank Bank2. Also, the N-th bank BankN may store weights used for calculation processings of the first PE PE1 and the second PE PE2 and provide stored weights to the first bank Bank1 and the second bank Bank2.

For example, referring to FIG. 8, a second data line DL2 may connect lines corresponding to the bit lines BL1 to BLK of a memory cell array MCA of the N-th bank BankN to the first PE PE1 and the second PE PE2. The N-th bank BankN may transmit weights stored in the memory cell array MCA of the N-th bank BankN to the first PE PE1 and the second PE PE2 through the second data line DL2.

In some example embodiments, the second data line DL2 may be connected to ALUs included in the first PE PE1 and the second PE PE2. For example, the second data line DL2 may be connected to ALUs of FIG. 5, and each ALU may perform a calculation operation based on weights received through the second data line DL2. The weights received through the second data line DL2 may be weights used for a calculation operation of at least one of the first to third multiplying circuits MC1, MC2, and MC3 and the first and second adding circuits AC1 and AC2 of the ALU.

Although it has been illustrated and described with reference to FIG. 8 that the N-th bank BankN transmits weights to the first PE PE1 and the second PE PE2 through the second data line DL2, the inventive concepts are not limited thereto. In some example embodiments, even when the second data line DL2 is not provided, the N-th bank BankN may transmit weights to the first PE PE1 and the second PE PE2. For example, the control logic 126 of FIG. 1 may control the N-th bank BankN to read out weights and transmit the weights to the first PE PE1 and the second PE PE2 through a local bus (e.g., the local bus 230 of FIG. 3A).

Also, although FIG. 8 shows that the N-th PE PEN is disposed at the N-th bank BankN, the inventive concepts are not limited thereto, and the N-th PE PEN may not be disposed at the N-th bank BankN.

Figure 9:
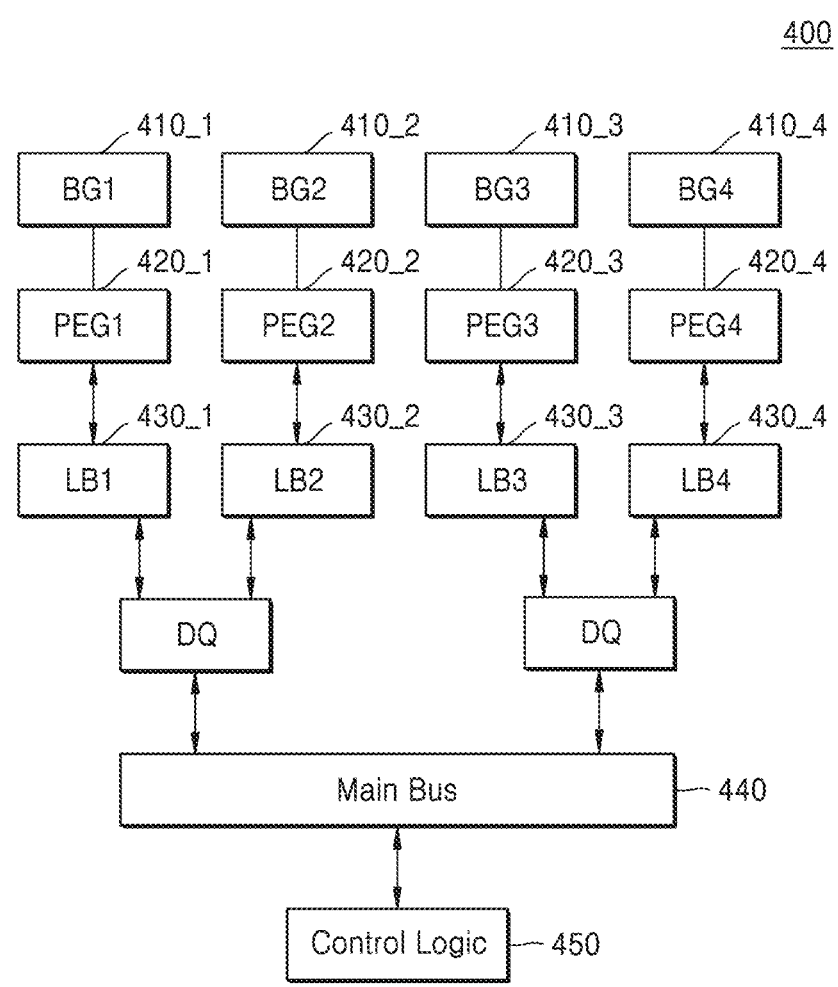
FIG. 9 is a block diagram showing an example implementation of a memory according to some example embodiments of the inventive concepts.

FIG. 9 is a block diagram showing an example implementation of a memory according to some example embodiments of the inventive concepts.

Referring to FIG. 9, a memory 400 may include first to fourth bank groups 410_1 to 410_4, first to fourth PE groups 420_1 to 420_4, first to fourth local buses 430_1 to 430_4, data pads DQ, a main bus 440, and a control logic 450.

The first to fourth bank groups 410_1 to 410_4 may each include a plurality of banks, and the first to fourth PE groups 420_1 to 420_4 may each include a plurality of PEs. In some example embodiments, the first to fourth PE groups 420_1 to 420_4 may be arranged in correspondence to the first to fourth bank groups 410_1 to 410_4, respectively. Also, the first to fourth local buses 430_1 to 430_4 may be arranged in correspondence to the first to fourth PE groups 420_1 to 420_4, respectively, and may transmit and receive data to and from the main bus 440 through the data pads DQ. The main bus 440 may include paths for transferring data between components inside the memory 400.

The control logic 450 may control a memory operation for reading data from or writing data to the first to fourth bank groups 410_1 to 410_4. In some example embodiments, the control logic 450 may control at least one of the first to fourth bank groups 410_1 to 410_4 to store image data based on an address corresponding to a writing location or control at least one of the first to fourth bank groups 410_1 to 410_4 to read image data based on an address corresponding to a reading location.

Also, the control logic 450 may control calculation operations of the first to fourth PE groups 420_1 to 420_4. In some example embodiments, the control logic 450 may control at least one of the first to fourth bank groups 410_1 to 410_4 and at least one of the first to fourth PE groups 420_1 to 420_4 to read out target data for calculation processing based on an address corresponding to a storage location of the target data and perform the calculation processing.

In some example embodiments, when the number of PEs is fewer than the number of banks, data of a particular bank without a corresponding PE may be transmitted to a PE corresponding to another bank through at least one of first to fourth local buses 430_1 to 430_4, and then calculation processing may be performed thereon. The control logic 450 may control a bank group to transmit data of a particular bank without a corresponding PE to a PE corresponding to another bank and may control the PE that received the data to perform calculation processing.

In some example embodiments, some of the first to fourth bank groups 410_1 to 410_4 may be configured to store image data corresponding to individual frames. For example, when the memory 400 performs an image processing operation (e.g., a denoising operation) using image data corresponding to 3 frames, the control logic 450 may control the first bank group 410_1 to store image data corresponding to a first frame, control the second bank group 410_2 to store image data corresponding to a second frame, and control the third bank group 410_3 to store image data corresponding to a third frame. Also, the control logic 450 may control first to third PE groups 420_1 to 420_3 to perform calculation operations by using image data corresponding to first to third frames.

Also, some of the first to fourth bank groups 410_1 to 410_4 may be configured to store weights used for neural network operations. For example, the fourth bank group 410_4 may store weights applied to calculation operations of the first to third PE groups 420_1 to 420_3. The control logic 450 may control the fourth bank group 410_4 to read out weights stored in the fourth bank group 410_4 and transmit the weights to the first to third PE groups 420_1 to 420_3 and may control the first to third PE groups 420_1 to 420_3 to perform calculation processings based on received weights.

However, the inventive concepts are not limited thereto, and one bank group may include both a bank storing target data of a calculation processing and a bank storing weights. Also, in some example embodiments shown in FIG. 9, the memory 400 may include various numbers of bank groups, PE groups, and local buses.

Figure 10:
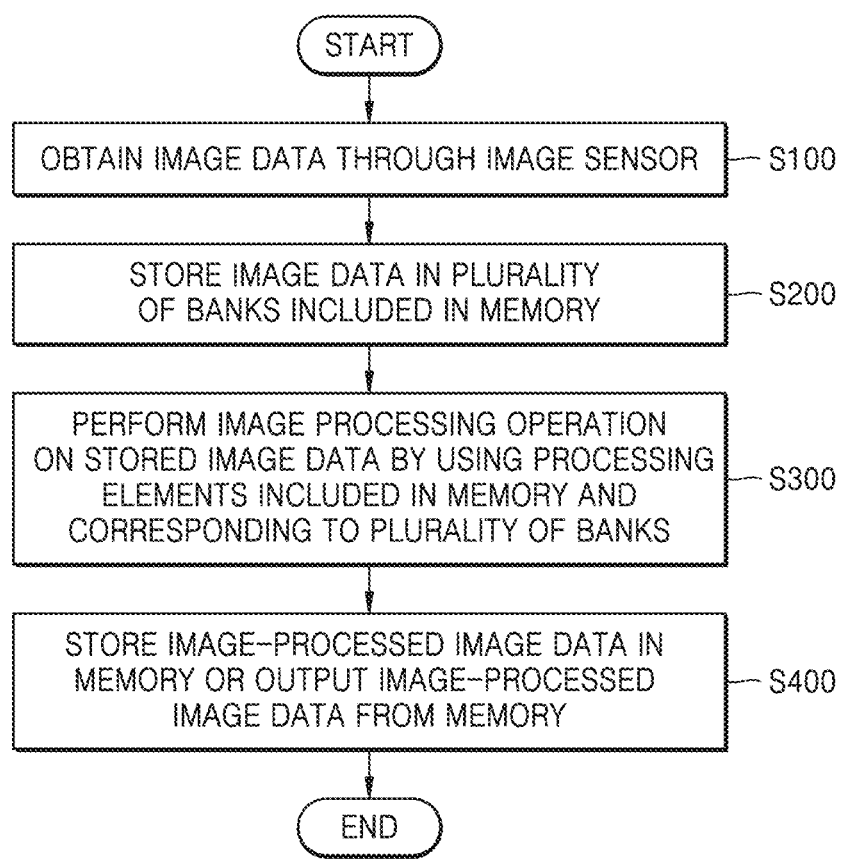
FIG. 10 is a flowchart of a method of operating an image sensor module according to some example embodiments of the inventive concepts.

FIG. 10 is a flowchart of a method of operating an image sensor module according to some example embodiments of the inventive concepts. The method of FIG. 10 may be performed by using the image sensor module 100 described above with reference to FIG. 1. It will be understood that the operations described with reference to FIG. 10 may be performed by any of the image sensor modules according to any of the example embodiments. It will also be understood that the order of the operations shown in FIG. 10 may be adjusted, including causing at least some of the operations to be performed at least partially concurrently (e.g., in parallel). One or more of the operations shown in FIG. 10 may be omitted from a method of operating an image sensor module according to some example embodiments, and one or more additional operations not shown in FIG. 10 may be added to the method.

Referring to FIGS. 1 and 10, the image sensor module 100 may obtain image data through the image sensor 110 (operation S100). Next, the image sensor module 100 may store image data in a plurality of banks included in the memory 120 (operation S200). In some example embodiments, the image sensor module 100 may divide one image data into a plurality of image regions and store the image regions in the banks. For example, the image sensor module 100 may store a first image region of the image data in a first bank and store a second image region of the image data in a second bank.

In some example embodiments, the image sensor module 100 may perform an image processing operation on stored image data by using PEs included in the memory 120 and corresponding to the banks. In detail, the image sensor module 100 may read out image data from a plurality of banks and perform calculation processing on read out image data by using PEs corresponding to the banks. In some example embodiments, the image sensor module 100 may read out a plurality of image regions stored in a plurality of banks and perform calculation processings on read out image regions by using PEs respectively connected to the banks. In some example embodiments, calculation processing performed by the image sensor module 100 may correspond to image processing operations and may correspond to calculation processings based on a neural network.

In some example embodiments, the image sensor module 100 may exchange data corresponding to edges of a plurality of image regions through a data line connected between a plurality of PEs. For example, a first PE and a second PE adjacent to each other may exchange data corresponding to an edge of a first image region data corresponding to an edge of a second image region through a data line.

In some example embodiments, the image sensor module 100 may perform an image processing operation based on a plurality of read out image regions and the exchanged data by using the PEs. For example, the first PE may perform an image processing operation based on data corresponding to the edge of the first image region read out by itself and data corresponding to the edge of the second image region obtained through an exchange. Also, the second PE may perform an image processing operation based on data corresponding to the edge of the second image region read out by itself and data corresponding to the edge of the first image region obtained through the exchange.

In some example embodiments, the image sensor module 100 may store image-processed image data in the memory 120 or output the image-processed image data from the memory 120 (operation S400). In some example embodiments, the image sensor module 100 may store image data calculation-processed by the memory 120 in the memory 120. In some example embodiments, the image sensor module 100 may transmit image data calculation-processed by the memory 120 directly to the signal processor 130. The signal processor 130 may perform additional image processing operations on received image data. In some example embodiments, the signal processor 130 may output the received image data to the outside of the image sensor module 100 through the interface 140.

Figure 11:
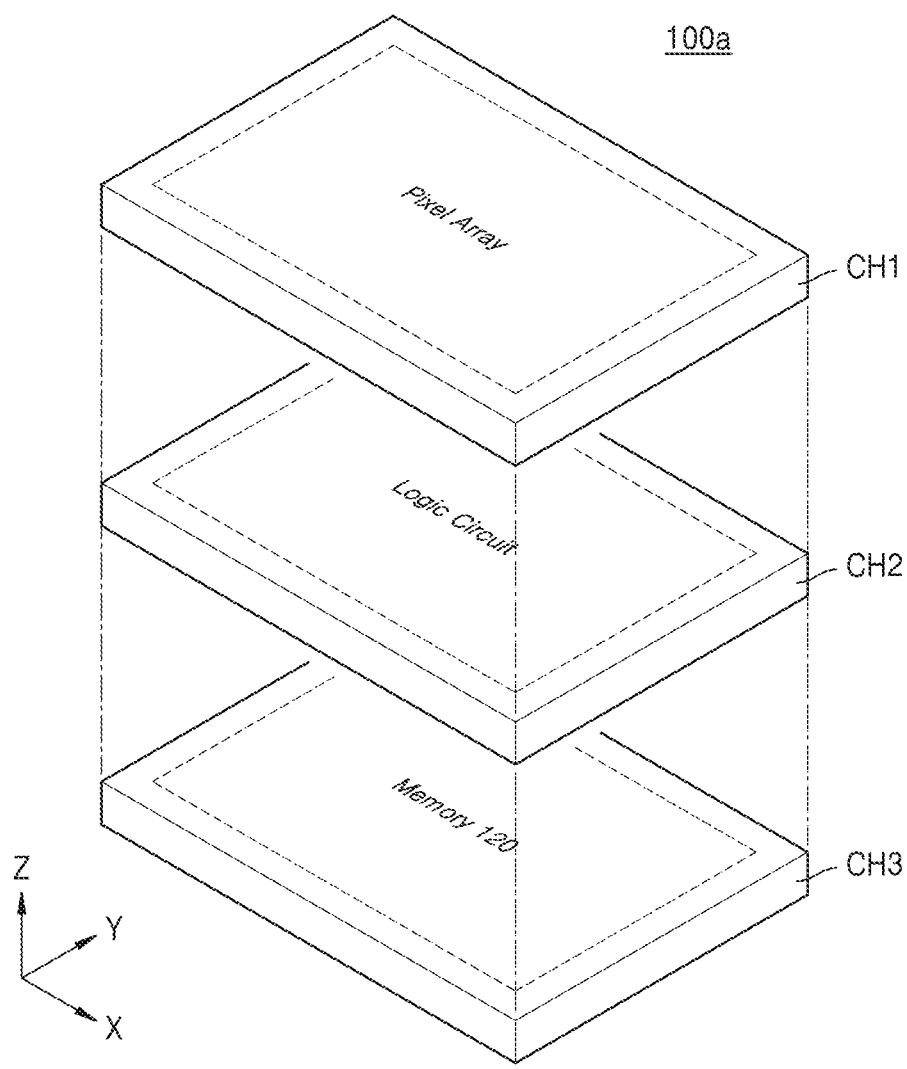
FIG. 11 is an exploded perspective view of an image sensor module.
Figure 12:
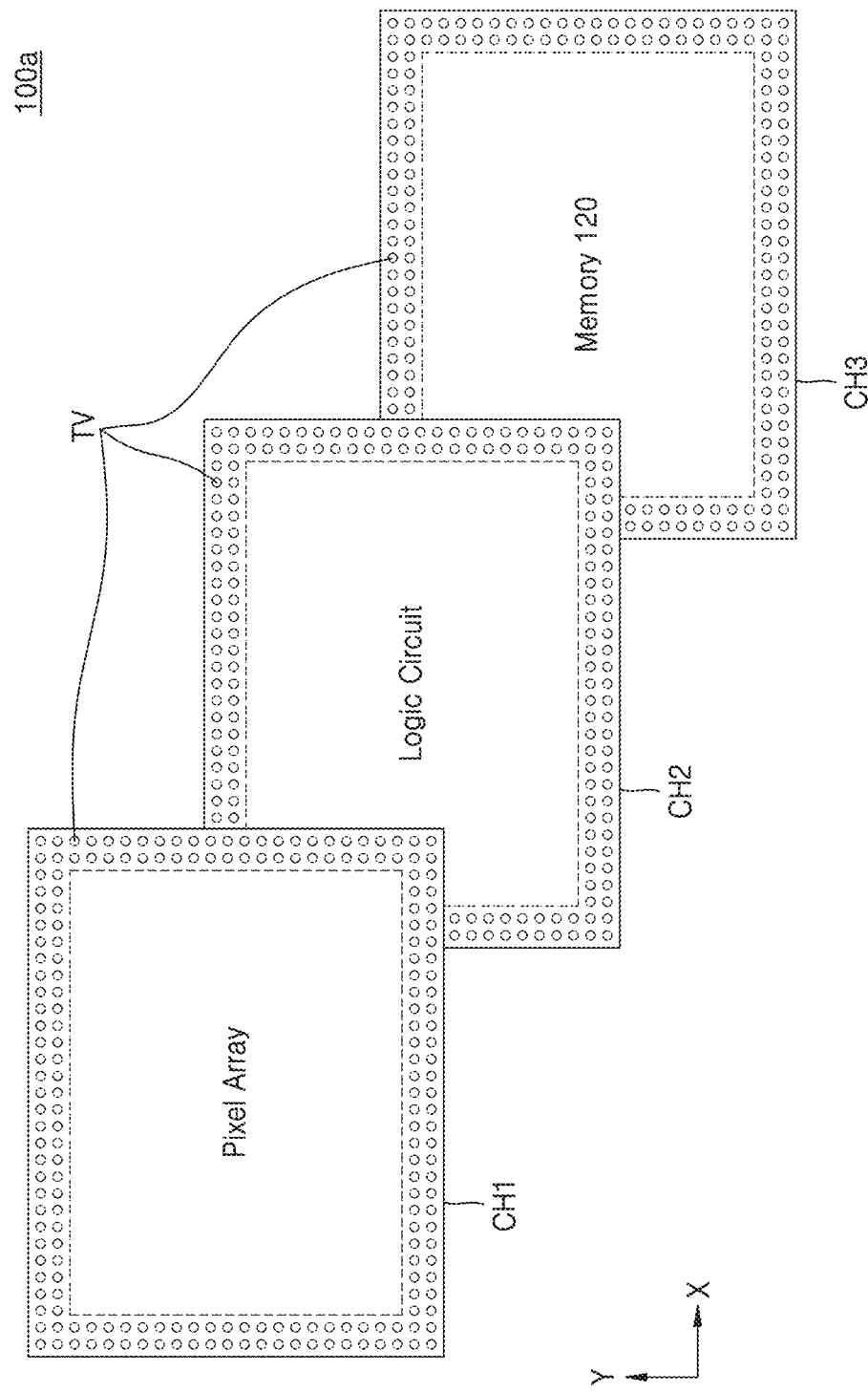
FIG. 12 is a plan view of an image sensor module.

FIG. 11 is an exploded perspective view of an image sensor module, and FIG. 12 is a plan view of the image sensor module. Referring to FIGS. 11 and 12, an image sensor module 100a may have a structure in which a first chip CH1, a second chip CH2, and a third chip CH3 are stacked. Pixel cores (e.g., at least one photoelectric conversion element and a pixel circuit) of a plurality of pixels included in a pixel array of an image sensor (110 of FIG. 1) may be formed on the first chip CH1. A driving and reading circuit including logic circuits like a row driver, a read-out circuit, a ramp signal generator, and a timing controller may be formed on the second chip CH2. A memory (120 of FIG. 1) may be formed on the third chip CH3. The first chip CH1, the second chip CH2, and the third chip CH3 may be electrically connected to one another through connecting members or through vias. However, the inventive concepts are not limited thereto, and the image sensor module 100a may also be implemented by one semiconductor chip.

As shown in FIG. 12, the first chip CH1, the second chip CH2, and the third chip CH3 may each include a pixel array, logic circuits, and a memory (120 of FIG. 1) arranged at the center and a peripheral region.

Through vias TV extending in a third direction (Z direction) may be arranged in peripheral regions of the first chip CH1, the second chip CH2, and the third chip CH3. The first chip CH1 and the second chip CH2 may be electrically coupled to each other through the through vias TV. Wires (not shown) extending in a first direction (X direction) or a second direction (Y direction) may be formed in the peripheral regions of the first chip CH1, the second chip CH2, and the third chip CH3.

Figure 13:
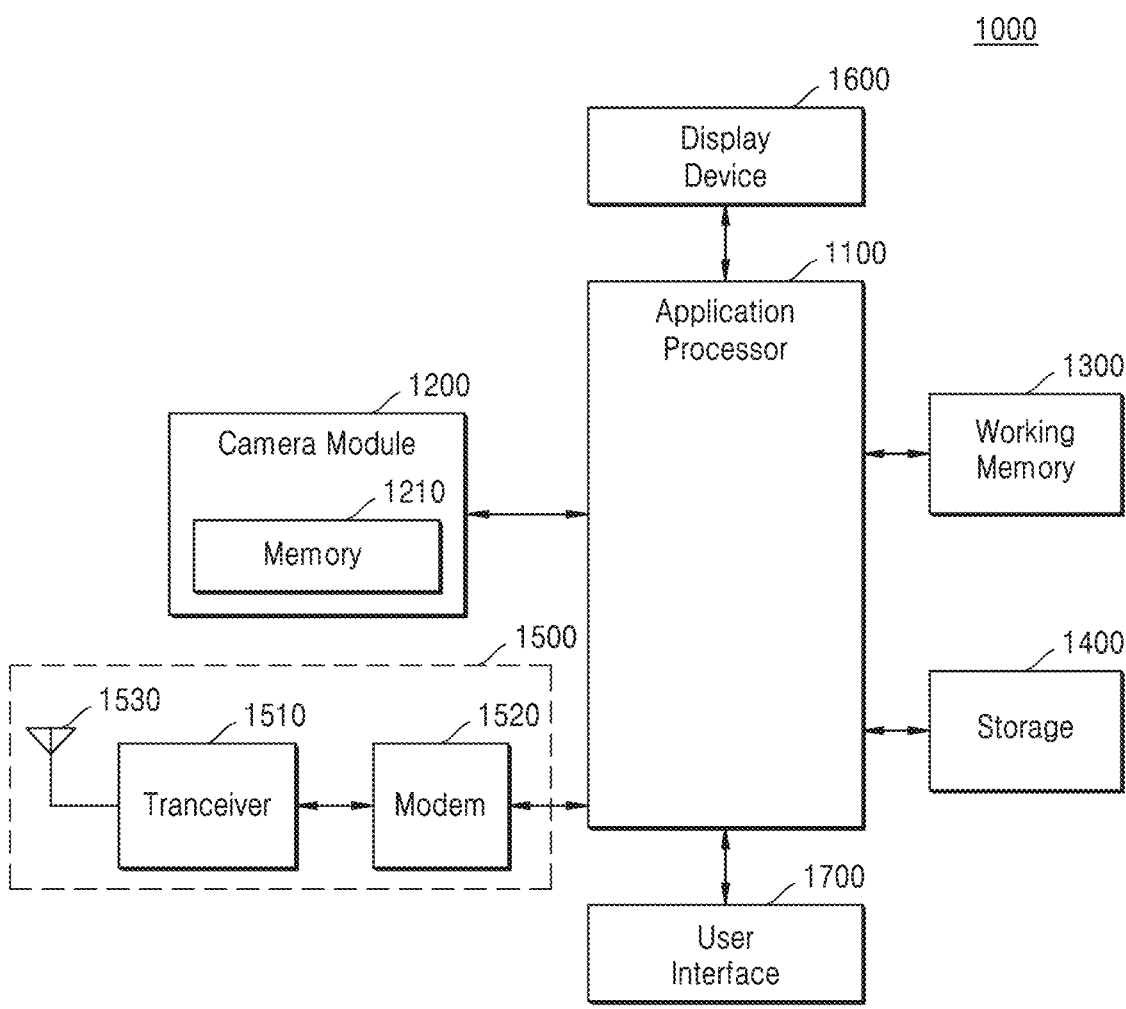
FIG. 13 is a block diagram of an electronic device according to some example embodiments of the inventive concepts.

FIG. 13 is a block diagram of an electronic device according to some example embodiments of the inventive concepts. The electronic device 1000 may be implemented as a digital camera, a digital camcorder, a mobile phone, a tablet PC, or a portable electronic device. The portable electronic device may include a laptop computer, a mobile phone, a smartphone, a tablet PC, a personal digital assistant (PDA), an enterprise digital assistant (EDA), a digital still camera, a digital video camera, an audio device, a portable multimedia player (PMP), a personal navigation device (PND), an MP3 player, a handheld game console, an e-book device, a wearable device, etc. Also, the electronic device 1000 may be installed as a part on a drone, an advanced drivers assistance system (ADAS), or an electronic device provided as a component of a vehicle, furniture, a manufacturing facility, a door, and various measuring devices. Referring to FIG. 13, the electronic device 1000 may include an application processor 1100, a camera module 1200, a working memory 1300, a storage 1400, a display device 1600, a user interface 1700, and a wireless transceiver 1500.

The application processor 1100 controls the overall operation of the electronic device 1000 and may be implemented as a system-on-chip (SoC) that drives an application program, an operating system, etc. The application processor 1100 may provide image data provided from the camera module 1200 to the display device 1600 or store the image data in the storage 1400.

The image sensor module 100 or 100a described above with reference to FIGS. 1 to 12 may be applied to the camera module 1200. The camera module 1200 may include a memory 1210 that performs calculation processing, and the memory 1210 may perform calculation processing on image data stored in a bank of the memory 1210 by using a PIM circuit.

The application processor 1100 may perform additional image processing operations on image data received from the camera module 1200 and display image-processed image data on the display device 1600 or store the image-processed image data in the storage 1400.

The working memory 1300 may be implemented by a volatile memory like a dynamic random access memory (DRAM) or a static RAM (SRAM) or a non-volatile resistive memory like a ferroelectric RAM (FeRAM), a resistive RAM (RRAM), or a phase-change RAM (PRAM). The working memory 1300 may store programs and/or data processed or executed by the application processor 1100.

The storage 1400 may be implemented with a non-volatile memory device like a NAND flash or a resistive memory. For example, the storage 1400 may be provided as a memory card (an MMC, an eMMC, an SD, a micro SD, etc.). The storage 1400 may store data received from the camera module 1200 or data processed or generated by the application processor 1100.

The user interface 1700 may be implemented with various devices capable of receiving user inputs, e.g., a keyboard, a curtain key panel, a touch panel, a fingerprint sensor, a microphone, etc. The user interface 1700 may receive a user input and provide a signal corresponding to the received user input to the application processor 1100.

The wireless transceiver 1500 may include a transceiver 1510, a modem 1520, and an antenna 1530.

In some example embodiments, some or all of the apparatuses, systems, electronic devices and/or elements thereof as described herein with reference to any of the drawings (including without limitation the elements of image sensor module 100-100a, any of the memories 200-200b, 300, 400, electronic device 1000, or the like) and/or any portions thereof (including without limitation any blocks, modules, processors, cameras, or the like) may include, may be included in, and/or may be implemented by one or more instances of processors such as hardware including logic circuits; a hardware/software combination such as a processor executing software; or a combination thereof. For example, a processor as described herein more specifically may include, but is not limited to, a central processing unit (CPU), an arithmetic logic unit (ALU), a graphics processing unit (GPU), an application processor (AP), a digital signal processor (DSP), a microcomputer, a field programmable gate array (FPGA), and programmable logic unit, a microprocessor, application-specific integrated circuit (ASIC), a neural network processing unit (NPU), an Electronic Control Unit (ECU), an Image Signal Processor (ISP), and the like. In some example embodiments, a processor may include a non-transitory computer readable storage device, for example a solid state drive (SSD), storing a program of instructions, and an instance of processor hardware, for example a CPU, configured to execute the program of instructions to implement the functionality and/or methods performed by some or all of any apparatus, system, and/or element according to any of the example embodiments (including without limitation any portion, block, module, processor, camera, or the like of any apparatus, system, and/or element according to any of the example embodiments), including for example any of the methods according to any of the example embodiments, including the method shown in FIG. 10.

While the inventive concepts has been particularly shown and described with reference to some example embodiments thereof, it will be understood that various changes in form and details may be made therein without departing from the spirit and scope of the following claims.

What is claimed is:

1. An image sensor module comprising:
   an image sensor configured to generate image data;
   a memory including a processor in memory (PIM) circuit and banks configured to store the image data, the PIM circuit including a plurality of processing elements; and
   a signal processor,
   wherein the memory is configured to
      read the image data from the banks, perform a first image processing operation on the image data by using the processing elements corresponding to the banks, and store image-processed image data on which the first image processing operation is performed in the banks or output the image-processed image data, wherein at least some of the plurality of processing elements are connected through a data line.

2. The image sensor module of claim 1, wherein, from among the banks, a first bank is connected to a first processing element from among the processing elements, and the first processing element performs calculation processing corresponding to the first image processing operation based on data read out from the first bank.

3. The image sensor module of claim 2, wherein, from among the banks, a second bank is adjacent to the first bank and connected to a second processing element from among the processing elements, and the first processing element is connected to the second processing element through a data line.

4. The image sensor module of claim 3, wherein the first processing element performs calculation processing corresponding to the first image processing operation based on data read out from the first bank and at least a portion of data read out from the second bank.

5. The image sensor module of claim 4, wherein the first processing element includes arithmetic logic units (ALUs) corresponding to bit lines of the first bank, and the second processing element comprises ALUs corresponding to bit lines of the second bank.

6. The image sensor module of claim 5, wherein, from among the ALUs of the first processing element, a first ALU adjacent to the second bank is connected to a second ALU adjacent to the first bank from among the ALUs of the second processing element through a data line.

7. The image sensor module of claim 3, wherein the memory includes a local bus for transmission and reception of data between the banks and the processing elements.

8. The image sensor module of claim 7, wherein, from among the banks, a third bank stores weight information respectively corresponding to the processing elements and transmits the weight information to at least one of the processing elements through the local bus.

9. The image sensor module of claim 7, wherein the memory reads out data stored in a fourth bank from among the banks and transmits read out data to the first processing element or the second processing element through the local bus.

10. The image sensor module of claim 1, wherein the first image processing operation is neural network-based calculation processing.

11. The image sensor module of claim 10, wherein the processing elements perform at least one of a convolution operation and a pooling operation from among neural network-based calculation processings.

12. The image sensor module of claim 10, wherein the first image processing operation includes at least one of denoising, demosaicing, or remosaicing.

13. A method of operating an image sensor module comprising an image sensor and a memory, the method comprising:

obtaining image data by using the image sensor;

storing the image data in banks included in the memory;

performing an image processing operation on the image data by using processing elements included in the memory and corresponding to the banks; and storing image-processed image data in the memory or outputting the image-processed image data from the memory, wherein at least some of the processing elements are connected through a data line.

14. The method of claim 13, wherein the storing of the image data in the banks includes dividing the image data into a plurality of image regions; and storing the image regions in the banks.

15. The method of claim 14, wherein the performing of the image processing operation includes reading out the image regions stored in the banks; and performing an image processing operation on the image regions by using the processing elements respectively connected to the banks.

16. The method of claim 15, wherein the performing of the image processing operation on the image regions includes exchanging data corresponding to edges of the image regions through a data line connected between the processing elements; and performing an image processing operation on the image regions based on the image regions and exchanged data by using the processing elements respectively connected to the banks.

17. An image sensor module comprising:

an image sensor configured to generate image data; and a memory configured to store the image data, wherein the memory includes a memory bank comprising a first bank and a second bank adjacent to each other;

a processor in memory (PIM) circuit comprising a first processing element connected to the first bank and a second processing element connected to the second bank; and a local bus for transmission and reception of data between the memory bank and the PIM circuit, wherein the first processing element and the second processing element are connected through a data line.

18. The image sensor module of claim 17, wherein the first processing element includes arithmetic logic units (ALUs) corresponding to bit lines of the first bank, and the second processing element comprises ALUs corresponding to bit lines of the second bank.

19. The image sensor module of claim 18, wherein, from among the ALUs of the first processing element, a first ALU adjacent to the second bank is connected to a second ALU adjacent to the first bank from among the ALUs of the second processing element through a data line.

\* \* \* \* \*